United States Patent [19]
Buckley

[11] Patent Number: 5,338,169
[45] Date of Patent: Aug. 16, 1994

[54] APPARATUS FOR MAKING PREFORMS

[75] Inventor: Daniel T. Buckley, Shrewsbury, Vt.

[73] Assignee: The C. A. Lawton Company, Shrewsbury, Vt.

[21] Appl. No.: 976,394

[22] Filed: Nov. 13, 1992

Related U.S. Application Data

[62] Division of Ser. No. 609,420, Nov. 5, 1990, Pat. No. 5,192,387.

[51] Int. Cl.$^5$ .................. B29C 43/34; B29C 43/56; B29C 43/58
[52] U.S. Cl. .................. 425/82.1; 264/25; 425/117; 425/126.1; 425/129.1; 425/145; 425/174.4; 425/174.8 R; 425/258; 425/388; 425/395; 425/408; 425/425
[58] Field of Search .................. 425/80.1, 82.1, 145, 425/174.8 R, 174.4, 174, 120, 112, 129.1, 388, 395, 408, 257, 258, 425, 436 R, 130, 117, 122, 126.1; 264/25, 119, 121, 128, 309; 156/245, 273.3, 275.5, 500; 249/134

[56] References Cited

U.S. PATENT DOCUMENTS

| | | | |
|---|---|---|---|
| 3,097,125 | 7/1963 | Green | 156/245 X |
| 3,878,019 | 4/1975 | Chapman et al. | 264/22 |
| 4,208,562 | 6/1980 | Perreault | 425/174.4 |
| 4,692,291 | 9/1987 | Angell, Jr. | 264/255 |
| 4,710,330 | 12/1987 | Lewandowski et al. | 425/174.4 |
| 4,921,205 | 5/1990 | Drew, Jr. et al. | 264/2.7 |
| 5,002,476 | 3/1991 | Kerr | 425/388 |
| 5,041,260 | 8/1991 | Johnson et al. | 264/510 |
| 5,110,514 | 5/1992 | Soane | 264/25 |

FOREIGN PATENT DOCUMENTS

| | | | |
|---|---|---|---|
| 59-133017 | 7/1984 | Japan | 264/112 |
| 2015915 | 9/1979 | United Kingdom . | |

*Primary Examiner*—Khanh Nguyen
*Attorney, Agent, or Firm*—Hill, Steadman & Simpson

[57] ABSTRACT

A directed fiber, directed energy process provides both a method and an apparatus for making structural preforms. Fibrous reinforcement material is chopped into short lengths of fiber and propelled toward a perforate mold part. During propulsion and/or after deposition on the perforate mold part the fibers are sprayed with an electromagnetic radiation-curable binder. The binder-carrying fibers are held on the perforate mold part by a flow of air in that the perforate mold part is rotatably mounted in a plenum which provides an air flow therethrough. Rotation of the perforate mold part and scanning action of the fiber and binder propelling mechanisms effects even and complete coverage of the perforate mold part. After a mat of the chopped fibers has been applied to the perforate mold part, a conforming second mold part closes the mold and presses the fibers to replicate the shape of the three-dimensional rigid preform. While in the mold, which may be advantageously constructed of an electromagnetic radiation transmissive material, the pressed fibers are subjected to electromagnetic radiation to cure the binder and bond the fibers of the mat into a rigid three-dimensional element. A subassembly, such as an auxiliary member or members, may be attached by applying an electromagnetic energy-curable binder to a selected area of the preform and/or the subassembly, placing the auxiliary member into a desired orientation and into intimate contact with the preform at the selected binder-coated area, and the binder at that area cured by the application of the electromagnetic energy. The electromagnetic energy may be, for example, microwave radiation and/or ultraviolet radiation.

20 Claims, 2 Drawing Sheets

APPARATUS FOR MAKING PREFORMS

This is a division of application Ser. No. 07/609,420, filed Nov. 5, 1990, now U.S. Pat. No. 5,192,387.

CROSS REFERENCE TO RELATED APPLICATIONS

This application is related to an application Ser. No. 446,859, filed Dec. 6, 1989 and to an application Ser. No. 552,253, filed Jul. 12, 1990, U.S. Pat. No. 5,217,656, issued Jun. 8, 1993.

BACKGROUND OF THE INVENTION

1. Field of the Invention

The present invention relates to a method and to an apparatus for making structural reinforcement preforms for resin transfer molding (RTM) and reaction injection molding (SRIM) processes for structural composites, and is more specifically concerned with techniques for making such structural reinforcement preforms in accordance with the directed fiber process.

2. Description of the Prior Art

As set forth in my aforementioned patent application Ser. No. 446,859, filed Dec. 6, 1989, and in my later application Ser. No. 552,253, filed Jul. 12, 1990, U.S. Pat. No. 5,217,656, issued Jun. 8, 1993, in making preforms according to the directed fiber process, it has been the practice to spray chopped fibers with a binder resin onto a form that has air pulled therethrough to locate and hold the fibers in place. The form with the fibers and the binder resin is then moved into a hot air plenum chamber, dried and/or cured to set the binder resin. Utilizing this process, a great deal of processing space is required for heating, drying, curing and cooling the preforms. The process has also therefore required large ovens and other equipment for handling the preforms.

In making thermoformed preforms, it has heretofore been the practice to coat a continuous strand fiber mat, during its manufacture, with a thermoplastic binder. The mat is supplied in roll form. The mat is unrolled and provided as a plurality of overlying flat sheets to vary the preform thicknesses and clamped into a holding frame at the edges thereof. The frame is then placed in an oven with radiant heaters which slowly heat the reinforcement mat and the thermoplastic binder from both sides. The thermoplastic binder softens in response to heating and, while soft, the frame is transferred into a cold mold which is then operated to press the reinforcement mat into the desired shape. Cooling causes the thermoplastic binder to stiffen and hold the thermoformable mat in its new shape.

As pointed out in my previous applications, these processes are slow, require a great deal of space and a large amount of energy for heating and cooling.

As also pointed out in my previously-mentioned applications, design flexibility is limited in that in order to meet the strength requirements of one area, an unnecessary use of material in other areas is required (layering) which also increases thickness and weight. Also, neither of the aforementioned processes permits the designer to add subassemblies such as ribs or closed sections to maximize design properties.

In my aforementioned applications, I proposed a new system which eliminates the necessity for large rooms and constantly operating ovens, cooled presses and the like and permits design flexibility with respect to the provision of subassemblies (reinforcement ribs, closed sections, and attachment and/or reinforcement members), while at the same time saving on energy and materials.

These new processes, as disclosed in the aforementioned applications, utilize specifically-developed and tailored binders along with directed energy systems for rigidizing the composite forms and attaching structural components to the preforms and is entirely compatible with RTM and SRIM resin systems, i.e. polyesters, vinyl esters, urethanes, epoxies, phenolics and acrylics. These new processes are designed to be fully automated and to enable specific distribution and placement of numerous types of reinforcements and the like, where necessary, for the required structural properties of a preform. There is also a complete freedom of design inherent in the process which permits the most desirable reinforcement type and/or structures including closed structural shapes and varied wall sections to meet design criteria.

In the process disclosed in the aforementioned application Ser. No. 446,859, filed Dec. 6, 1989, mats of reinforcement material are cut into a desired shape as a two-dimensional planar development of a desired preform. The cut mats are then coated with a binder which is responsive to electromagnetic energy, either microwave radiation or ultraviolet radiation, and the cut mats are placed in a three-dimensional mold and pressed to replicate the desired shape of the preform. While in the mold, the shaped mats are subjected to the appropriate electromagnetic radiation, either microwave or ultraviolet radiation, to cure the binder resin and provide rigidity in a matter of seconds, rather than minutes or hours as with the heat-curable processes. At this point, the preform may be considered a finished product for use in a further molding operation (RTM, SRIM) or may be viewed as a carrier preform for the attachment of subassemblies such as structural reinforcement members and the like before being used in a further molding operation (RTM, SRIM).

When the preform is considered to be a carrier preform, the same is removed from the mold to a station where a designated area or areas of its inner and/or outer surfaces or that of a subassembly or subassemblies are provided with a further coating of an electromagnetic energy-curable binder, a reinforcement member or the like is moved into intimate contact with the preform at the coated area or areas and the appropriate electromagnetic radiation (microwave or ultraviolet) is applied to energetically stitch (cure the binder) the member to the carrier preform. When the final attachment has been made by such energetic stitching, the preform is a finished product in itself ready for use as a structural reinforcement preform as a part of a further molding process for making a structural composite.

As pointed out in the latter application Ser. No. 552,253, particularly with respect to the handling of reinforcement material supplied on rolls that must be unrolled and individually cut into the desired shape and individually stacked in registry in the mold, handling is simplified and registration is inherent when such layers are tacked together prior to or contemporaneously with cutting (termed energetic basting) by applying the binder to superposed webs prior to cutting, pressing the superposed webs together to increase the surface contact of the binder with the fibers of adjacent webs and curing the binder in local spaced zones so as to tack the webs together either before or during the cutting operation.

This technique has also proved efficient in that the tacking is localized and there is sufficient binder remaining for curing to rigidize a multi-layer mat in a desired three-dimensional shape after first cutting a two-dimensional development of that shape from the tacked webs.

After the preform has been rigidized, energetic stitching techniques may still be employed to attach subassemblies, such as reinforcement and/or attachment members, thereto.

SUMMARY OF THE INVENTION

It is an object of the present invention to provide an improved directed fiber process for making structural preforms while at the same time eliminating the necessity for handling webs of materials in the manner described in my aforementioned patent applications, such as energetic basting of the mats or the handling and registry of single-layer mats, by applying the directed energy techniques to the basic directed fiber process.

The above object is achieved, according to the present invention, by providing a mold which is perforate to support a flow of air therethrough when placed in a plenum, although in the present process heated air is not required because of the subsequent directed energy curing. The reinforcement material is drawn from a supply of roving on spools, chopped and flung as would occur by spraying into the air stream and toward the perforate mold part. An electromagnetic energy-curable binder is sprayed into the air stream-borne fibers to at least partially coat the fibers with binder during their travel to the perforate mold part and/or after reaching their destinations at the mold part. During the application of the fibers and the binder, the perforate mold part is rotated so as to obtain complete coverage with the fibers to a desired thickness. In order to enhance and even coverage, the fibers and binder are directed from the distal end of a robot arm which may be operated in accordance with a program to scan the perforate mold part to ensure coverage at all areas including the inside corners thereof.

After the fibers and binder have been applied to the perforate mold part, the mold is closed to press the applied fibrous mat into the desired shape of a preform by pressing a complementary shaped second mold part against the perforate mold part. This is a low-pressure pressing operation and ensures that the fibers bridging the inside and outside corners of the shaped mat are deformed to conform to the shapes of those corners.

While still in the mold, the pressed mat of binder-coated fibers is illuminated with the appropriate electromagnetic radiation (either microwave or ultraviolet) as disclosed in my aforementioned patent applications to cure the binder and rigidize the fibrous mat in the pressed shape. At this time, the figidized three-dimensional fibrous mat is a preform which may be transferred to a molding process for making a structural composite or it may be considered a carrier preform which is to have reinforcement members or the like attached thereto.

If the preform is considered to be a carrier preform, the same is removed from the mold to a station at which at least one selected surface area of the preform and/or a subassembly is coated with an electromagnetic energy-curable binder, a subassembly e.g. a reinforcement member is brought into intimate contact with the preform at the coated area and the appropriate electromagnetic energy is applied to the coated area to cure the binder and attach the reinforcement member to the preform. This operation, as set forth in my aforementioned patent applications, is termed energetic stitching and may occur as many times as desired to attach subassemblies (reinforcement members, closures, attachment members and the like) to the preform prior to movement of the same into a molding process such as an RTM process or an SRIM process.

BRIEF DESCRIPTION OF THE DRAWING

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 3:
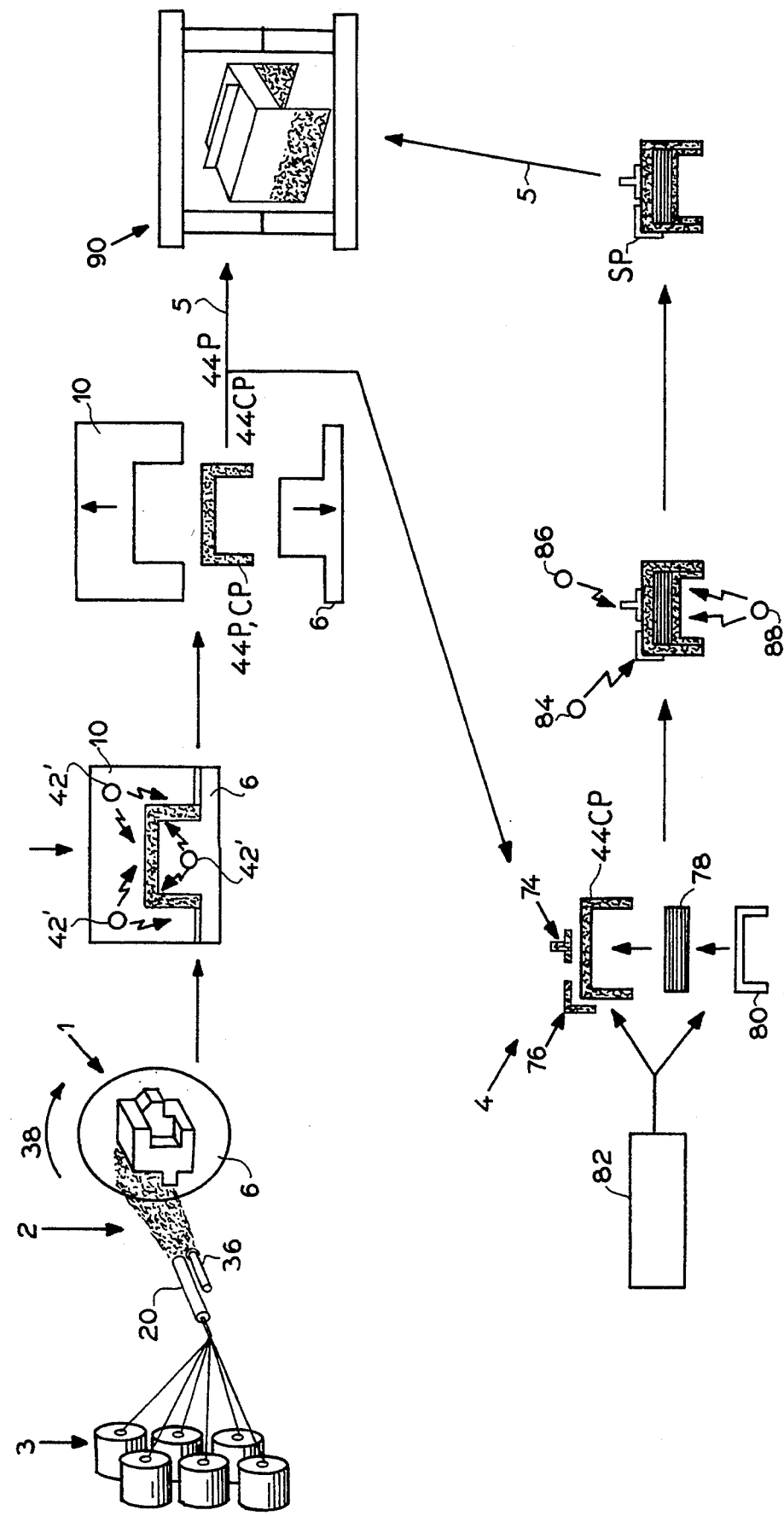
FIG. 3 is a process flow chart for making a structural composite utilizing the directed fiber, directed energy techniques of the present invention.

Referring to FIG. 3, the basic directed fiber, directed energy process is generally illustrated as being performed in five stages 1–5 including a molding stage 1, an application stage 2, a supply stage 3, an energetic stitching stage 4, and a discharge stage 5.

Figure 1:
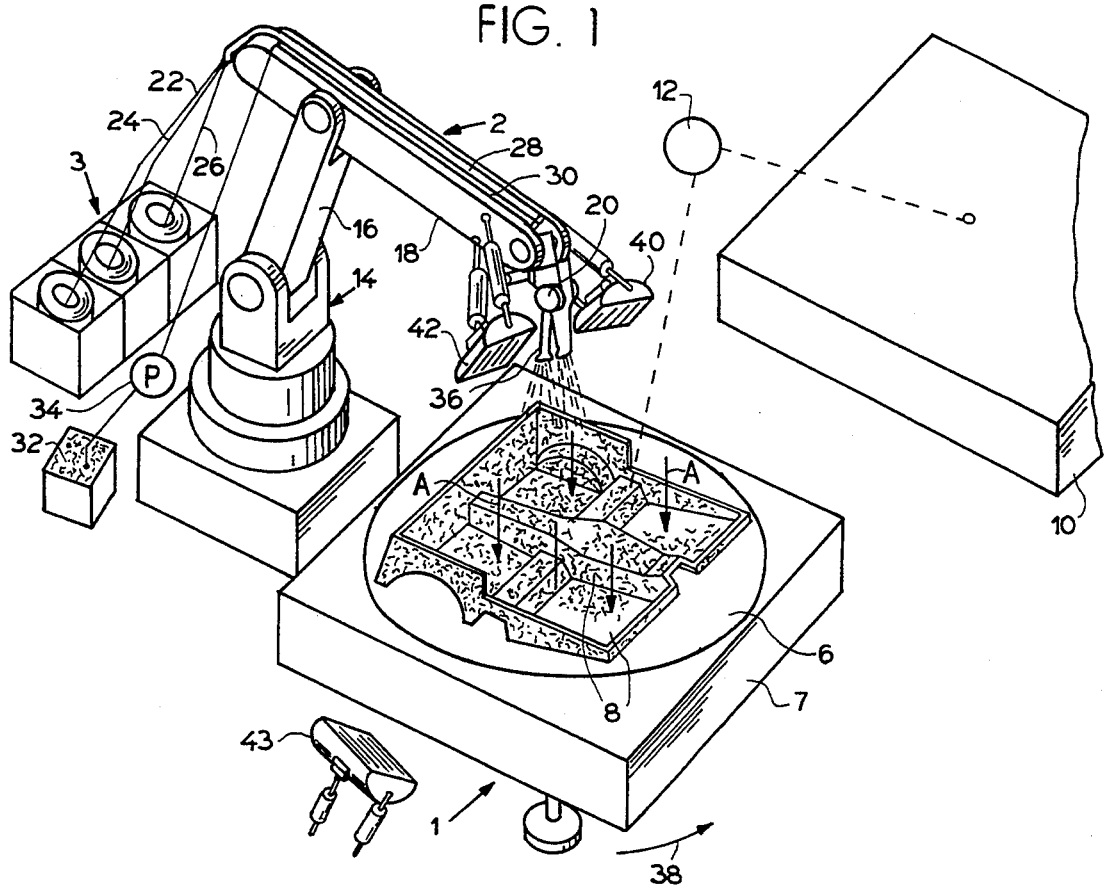
FIG. 1 is a schematic representation of the improved directed fiber, directed energy process and apparatus for carrying out that process in accordance with the present invention, including energetic stitching.

The molding stage 1 (FIG. 1) comprises a lower, first mold part 6 which is supported for rotation by a plenum 7. The first mold part 6 is a perforate element which will support a flow of air therethrough by way of the plenum 7 to build up a mat on surfaces 8 which are oblique to one another and define inner and outer corners. The mold part 6 is complementary to an upper, second mold part 10 and the two parts have complementary inner surfaces which define a desired three-dimensional shape of a preform for replication of the preform.

The mold parts 6 and 10 are parts of a low-pressure press mold and are illustrated as being mechanically linked to a mold closing and opening mechanism 12 which may be constituted by a hydraulic ram or rams and appropriate guides and linkages as are well known for press molds. With the mold open, short fibers of reinforcement material, such as glass fiber reinforcement material, and a binder resin which is curable in response to a selected electromagnetic radiation, are propelled into the air stream established through the plenum and the perforate mold part 6 and directed onto the profile shape of the mold part 6. In order to improve coverage, the mold part 6 is rotated as indicated by the arrow 38 and the fibers and binder are directed, via the air stream, onto the mold part 6 by way of a robot 14 of the applicator stage 2.

The robot 14 is illustrated as comprising a vertical axis and at least two horizontal axes so that the fibers and binder emanating from the distal end of the arm structure 16, 18 may be directed to all parts of the rotatable mold part 6.

The application stage 2 is illustrated as comprising the robot having the arms 16 and 18, a chopper 20 which receives roving 22, 24, 26 from spools of roving at the supply stage 3 via a tube 28 mounted on the arm 18, and a conduit 30 carrying binder 32 supplied by way of a pump 34 to a spray nozzle 36, and an outlet port 22 for the chopped fibers.

The supply stage 3 is illustrated as comprising a plurality of spools of the reinforcement material roving 22, 24 and 26 fed into a tube 28 as well as the supply of binder 32 and the pump 34.

The chopper 20 may comprise one or more spinning elements, including gears and knife blades, for drawing and chopping the roving 22, 26 and flinging the chopped fibers into the air stream and towards the perforate mold part 6. A source of electromagnetic energy, here constituted by a pair of ultraviolet lamps 40 and 42, is mounted at the distal end of the robot arm 18.

In operation, the chopper 20 draws the roving 22–26, chops the same and flings the chopped fibers toward the perforate mold part 6. Contemporaneously, the binder is sprayed from the spray nozzle 36 to at least partially coat the directed fibers on their way to and/or at the perforate mold part 6. As the fibers are directed to the mold part 6, the mold part 6 is rotated, as indicated by the arrow 38, and the robot is operated to scan all of the inner surfaces of the perforate mold part 6 in conjunction with the rotation thereof so that an even deposition of the fibers to a predetermined thickness is obtained over all of the inner surfaces of the mold part 6.

After application of the fibers to the mold part 6, the mold is closed by the mold operating mechanism 12 to close the mold part 10 onto the mold part 6 and press the fibrous mat to conform to the desired-dimensional shape of the preform. The mold is constructed of a material which is transmissive to the ultraviolet radiation, such as a wire grid and/or a general purpose clear acrylic material which does not contain ultraviolet blockers. While the mold is closed, the lamps 40 and 42, and possibly additional lamps, such as a lamp 43, (or a microwave source) are energized to illuminate the pressed fibrous mat with ultraviolet radiation to cure the ultraviolet energy-curable binder causing binding of the fibers and rigidizing of the pressed mat into the rigid three-dimensional preform.

At this point, the preform may be employed for molding a structural composite. As such, the mold is opened and the preform is picked up from the mold by another robot or the like (not shown) similar to the robot 14 and placed on a conveyor 60 of the discharge station 5 for transport to storage or to the further molding process.

If the preform is to assume the character of a carrier preform and is to have a subassembly or subassemblies attached thereto, the robot, or another robot, either holds the preform 44 in a desired position or places the same on a work table in the desired position for the attachment of a reinforcement member at the energetic stitching stage 4. Here, the preform 44 is illustrated as residing on a table in the desired position. With the preform in this position, another robot 54 may be operated to apply an ultraviolet energy-curable binder from a reservoir 52 and via a pump 50 through a dispenser or spray nozzle 48 mounted at the distal end of a robot arm 56 of the robot 54, the binder being applied to at least one selected surface of the preform 44 and/or of the subassembly. Then, a reinforcement insert 46 may be placed, as by another robot, into a desired position and into intimate contact with the preform at the selected area having the binder coating thereon. The robot 54 then positions itself to apply a high-intensity ultraviolet radiation to the binder at the selected area by way of an ultraviolet wand 58, the wand 58 being connected to an ultraviolet source (not shown). As an alternative, microwave radiation may also be employed for this purpose.

The last operation, known as "energetic stitching", may be accomplished any number of times to apply reinforcement members and/or attachment members (engineered structural members) to the preform prior to its use in making a structural composite. After the last subassembly has been energetically stitched thereto, the preform 44 carrying the additional members is moved by another robot (not shown) to the conveyor 60 of the discharge stage 5.

Through the use of other selected binders, the curing thereof may be accomplished by microwave techniques, as disclosed in my aforementioned patent applications, or by electron beam, as disclosed in my latter patent application Ser. No. 552,253.

Figure 2:
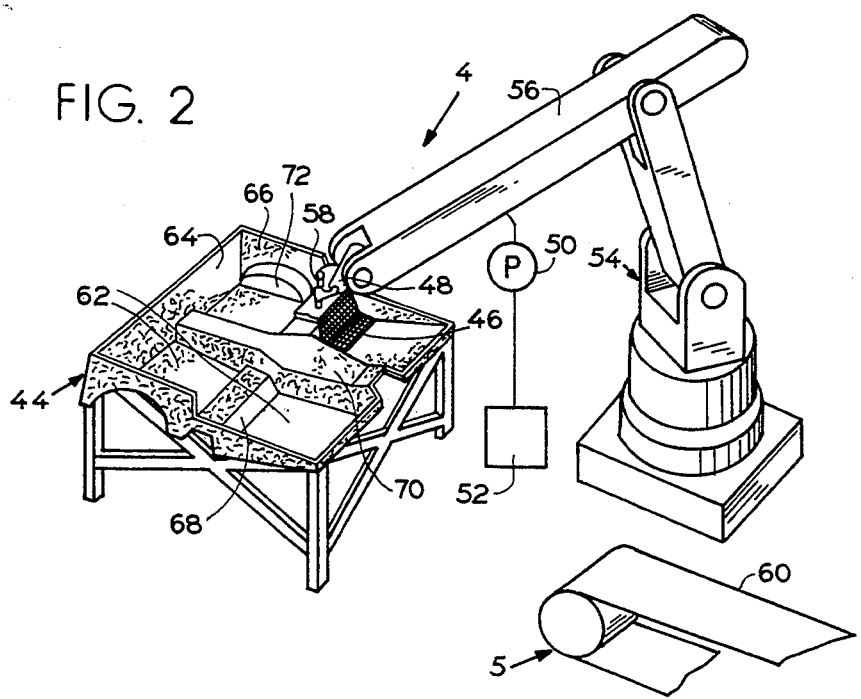
FIG. 2 is a perspective view of a preform constructed in accordance with the method and apparatus of FIG. 1.

Referring to FIG. 2, the structure and character of a typical preform is illustrated in which the preform 44 comprises a plurality of generally horizontal, or slightly oblique to the horizontal, panels 62 having a plurality of vertical walls 64, 66 extending therefrom along with generally U-shaped profile sections 68, 70, 72. Any other shape can be formed which is consistent with directing the fibers to catching and supporting surfaces which can be defined by inner surfaces, including insert plugs, of the upper and lower mold parts.

Referring to FIG. 3, a process for making a structural composite is illustrated in the form of a flow chart, the process incorporating the directed fiber, directed energy concepts of the present invention. As previously set forth, the roving is drawn from a supply stage 3, chopped with a chopper 20 and directed onto a perforate member having air drawn therethrough via a plenum structure and which is rotatable as indicated by the arrow 38. The chopped fibers directed toward the perforate element are sprayed with a binder emanating from a spray nozzle 36. The rotation of the perforate element and scanning by the chopper 20 and the spray nozzle 36 provides an even coating or mat of binder-coated fibers deposited to a predetermined thickness.

The perforate element is, in the illustrated embodiment, a lower mold part 6 which has a complementary upper mold part 10 which is moved to close the mold so that the mat of fibers accurately replicates the desired size and shape of the preform. The binder is an electromagnetic energy-curable binder, here an ultraviolet energy-curable binder and is cured by the illumination of the pressed mat by way of a plurality of ultraviolet lamps which are illustrated here as being incorporated in the mold parts 6 and 10. The mold parts 6 and 10 are constructed of an ultraviolet-transmissive material, such as grid or a general purpose, clear acrylic material which does not include ultraviolet blockers.

Next, the mold is opened by providing a separation between the mold parts 6 and 10 so that the cured, rigidized three-dimensional preform may be removed. The preform is here referenced 44P, 44CP, in that the preform may now assume the character of a final element 44P for movement by way of the discharge stage 5 to an RTM or SRIM molding process 90, or it may assume the character of a carrier preform 44CP and be moved to an energetic stitching station 4 for the application of subassemblies, such as reinforcement fibs, cores, covers and the like.

At the energetic stitching station 4, the carrier preform 44CP may have an external rib 74 (and/or an internal rib), a reinforcement corner 76, a core 78 and a cover 80 connected thereto by the application of an ultraviolet energy-curable binder applied from a source 82 to a selected surface area or surface areas of the carrier preform 44CP and/or the rib 74, the corner 76 and the cover 80. The cover 80 will hold the core 78 within the preform 44CP and the core 78 is not necessarily tacked to the carrier preform. The purpose of the core 78 is to save material in the RTM/SRIM later molding process in which the plastic material could migrate through the hollow, porous wall of the preform into the pocket or cavity which would give rise to an excess use of material, an increased weight and an extension of the curing time for the applied plastic.

After the application of the binder and the subassemblies to the carrier preform 44CP, the binder-coated selected areas are subjected to further ultraviolet radiation by way of a plurality of ultraviolet lamps 84, 86, 88 or by one or more ultraviolet wands manipulated by a robot or robots, as set forth above.

Finally, the energetic stitching produces a structural preform SP which is then transferred by way of the discharge stage 5 to the RTM/SRIM molding process 90.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for making a rigid three-dimensional preform, comprising:
   a separable mold including separable first and second mold parts, each of said mold parts including a profiled inner surface complementary to the like inner surface the other mold part, said complementary inner surfaces together replicating the desired three-dimensional shape of the preform including any inside and outside corners of the preform, said inner surface of said first mold part being perforate to support a flow of air therethrough, and said mold parts comprising material at least at said inner surfaces which is transmissive with respect to a predetermined electromagnetic radiation;
   a plenum providing a flow of air and mounting said first mold part;
   a reinforcement material supply for providing fibers as reinforcement material and discharge means for discharging the fibers onto said first mold part to be held thereat by the air flow through said first mold part;
   a binder source for supplying binder which is curable in response to said predetermined electromagnetic radiation;
   spray means connected to said binder source for spraying and at least partially coating the fibers with the binder;
   mat forming means mounting said discharge means and said spray means and movable to cause complete coverage of said inner surface of said first mold part with binder-coated fibers to form a mat of predetermined thickness;
   mold operating means connected to at least said second mold part for moving said second mold part to close said separable mold and press said mat of binder-coated fibers to form the desired three-dimensional shape of the preform including deforming any fibers which bridge inner and outer corners into conforming shape;
   an energy source of said predetermined electromagnetic energy coupled to said mold and operated to apply said predetermined electromagnetic energy to said mat causing the binder to cure, harden and bind the fibers of said mat into a rigid three-dimensional preform.

2. The apparatus of claim 1, wherein said mat forming means comprises:
   a base;
   an arm pivotally mounted on said base for rotation about at least two orthogonal axes; and
   said spray means and said discharge means mounted on the distal end of said arm.

3. The apparatus of claim 2, wherein:
   said apparatus includes cutting means positioned for cutting the fibers;
   said reinforcement material supply includes a plurality of spools of roving of the reinforcement material; and
   a conduit for guiding the roving therethrough to said cutting means.

4. The apparatus of claim 3, wherein:
   said cutting means comprises a chopper operating to draw and chop the roving and expel the cut fibers and thereby further constitutes said discharge means.

5. The apparatus of claim 2, wherein:
   said energy source is mounted on the distal end of said arm.

6. The apparatus of claim 2, wherein:
   said predetermined electromagnetic energy is ultraviolet energy; and
   said energy source comprises ultraviolet lamp means.

7. The apparatus of claim 2, wherein:
   said predetermined electromagnetic energy is ultraviolet energy; and
   said energy source comprises ultraviolet lamp means carried by the distal end of said arm.

8. The apparatus of claim 1, wherein:
   said electromagnetic radiation transmissive material of said mold parts includes a metal perforate grid; and
   said predetermined electromagnetic energy is ultraviolet radiation.

9. The apparatus of claim 1, wherein:
   said electromagnetic radiation transmissive material of said mold parts includes clear ultraviolet transparent rigid plastic material; and
   said predetermined electromagnet energy is ultraviolet radiation.

10. Apparatus for making a rigid three-dimensional structural preform using a separable mold including a perforate first mold part and a pressing second mold part, the mold parts, when closed, together defining the desired three-dimensional shape of the preform and including inner surfaces disposed at angles with respect to one another forming inside and outside corners, the apparatus comprising:
    means for cutting fibers of reinforcement material into short lengths;
    means for propelling the cut fibers onto the perforate first mold part and including means for contemporaneously flowing air through the first mold part to direct the fibers onto all surfaces of the first mold part to a predetermined thickness;

means for spraying an electromagnetic energy-curable binder onto the cut fibers to at least partially coat the fibers with the binder;

means for closing the mold to press the binder-coated cut fibers into the desired shape such that the fibers bridging inside and outside corners are deformed into the desired shapes of the corners;

means for applying electromagnetic energy to the binder-coated pressed fibers while in the closed mold to cure the binder and bond the fibers to produce the rigid three-dimensional preform;

means for opening the mold; and means for removing the rigidized three-dimensional preform.

11. Apparatus for making a rigid three-dimensional structural preform using a separable mold including a perforate first mold part and a pressing second mold part, the mold parts, when closed, together defining the desired three-dimensional shape of the preform and including inner surfaces disposed at angles with respect to one another forming inside and outside corners, the apparatus comprising:

means for directing cut fibers onto the perforate first mold part and for flowing air through the first mold part to direct the fibers onto all surfaces of the first mold part to a predetermined thickness;

means for applying an electromagnetic energy curable binder onto the cut fibers in an amount to partially coat the fibers with the binder;

means for closing the mold parts to press the binder coated cut fibers into the desired shape such that fibers bridging inside and outside corners are deformed into the desired shapes of the corners;

and means for applying electromagnetic energy to the binder coated pressed fibers while in a closed mold to cure the binder and bond the fibers to produce a rigid three-dimensional preform so that a preform is formed in the mold and is removable for completion of manufacture of a completed object from the preform.

12. Apparatus for making a rigid three-dimensional structural preform using a separable mold including a perforate first mold part and a pressing second mold part, the mold parts, when closed, together defining the desired three-dimensional shape of the preform and including inner surfaces disposed at angles with respect to one another forming inside and outside corners, the apparatus constructed in accordance with claim 11:

wherein an ultraviolet energy curable binder is applied to the cut fibers and an ultraviolet energy is applied to the binder coated pressed fibers.

13. Apparatus for making a rigid three-dimensional preform, comprising:

a separable mold including separable first and second mold parts, each of said mold parts including a profiled inner surface complementary to the like inner surface of the other mold part;

said complementary inner surfaces together replicating the desired three-dimensional shape of the preform including any inside and outside corners of the preform;

said inner surface of said first mold part being perforate to support a flow of air therethrough, and said mold parts comprising material at least at said inner surface which is transmissive with respect to a predetermined electromagnetic radiation;

a reinforcement material for providing fibers as reinforcement material and for discharging the fibers onto said first mold part to be held thereat by the air flow through said first mold part;

means directing an air flow through the first mold part to direct the fibers onto all surfaces of the first mold part to a predetermined thickness;

a binder source for supplying binder which is curable in response to said predetermined electromagnetic radiation;

spray means connected to said binder source for spraying and at least partially coating the fibers with the binder;

means closing the separable mold parts to press the binder coated fibers into the desired three-dimensional shape of the preform between the mold parts such that fibers bridging inside and outside corners are deformed into desired shapes of the corners of the closed mold;

means applying electromagnetic energy to the binder coated pressed fibers while in the closed mold to cure the binder and bond the fibers to produce the rigid three-dimensional structural preform;

and means removing the rigid three-dimensional structural preform from the mold.

14. The apparatus for making a rigid three-dimensional preform constructed in accordance with claim 13:

wherein the spray means is located for spraying the fibers as they are cut and entering the mold.

15. The apparatus for making a rigid three-dimensional preform constructed in accordance with claim 13:

wherein the spray means is located to spray the fibers after they are deposited in the mold.

16. The apparatus for making a rigid three-dimensional preform constructed in accordance with claim 13:

wherein said binder source supplies a binder which is curable in response to ultraviolet energy and the mold parts comprise material transmissive of ultraviolet energy.

17. The apparatus for making a rigid three-dimensional preform constructed in accordance with claim 13:

including means for applying an ultraviolet energy-curable binder to at least one selected area of the preform received from the mold;

means moving a subassembly into intimate contact with the preform at at least the selected binder coated area;

and means radiating ultraviolet energy onto said selected binder coated area to cure the binder and attach the subassembly to the preform by energetic stitching.

18. The apparatus for making a rigid three-dimensional preform constructed in accordance with claim 13:

including means for applying an ultraviolet energy-curable binder to the preform received from the mold;

means moving a subassembly into intimate contact with the preform at at least the selected binder coated area;

and means radiating ultraviolet energy onto a selected binder coated area to cure the binder in said selected area and attach the subassembly to the preform by energetic stitching.

19. The apparatus for making a rigid three-dimensional preform constructed in accordance with claim 13:

including means for applying microwave radiation curable binder to at least one selected area of the preform received from the mold;

means moving a subassembly into intimate contact with the preform at at least the selected binder coated area;

and means radiating microwave radiation energy onto said selected binder coated area to cure the binder and attach the subassembly to the preform by energetic stitching.

20. Apparatus for making a rigid three-dimensional preform, comprising:

a separable mold including separable first and second mold parts, each of said mold parts including a profiled inner surface complementary to the like inner surface of the other mold part;

said complementary inner surfaces together replicating the desired three-dimensional shape of the preform including any inside and outside corners of the preform;

said inner surface of said first mold part being perforate to support a flow of air therethrough, and said mold parts comprising material at least at said inner surface which is transmissive with respect to a predetermined electromagnetic radiation;

a reinforcement material for providing reinforcement material including cutting means for cutting the reinforcement material into short fibers and discharge means for discharging the cut fibers onto said first mold part to be held thereat by the air flow through said first mold part;

means directing an air flow through the first mold part to direct the fibers onto all surfaces of the first mold part to a predetermined thickness;

a binder source for supplying binder which is curable in response to said predetermined electromagnetic radiation;

spray means connected to said binder source for spraying and at least partially coating the cut fibers with the binder;

means closing the separable mold parts to press the binder coated cut fibers into the desired three-dimensional shape of the preform between the mold parts such that fibers bridging inside and outside corners are deformed into desired shapes of the corners of the closed mold;

means applying electromagnetic energy to the binder coated pressed fibers while in the closed mold to cure the binder and bond the fibers to produce the rigid three-dimensional structural preform;

and means removing the rigid three-dimensional structural preform from the mold.

* * * * *